US009712549B2

(12) United States Patent
Almurayh

(10) Patent No.: US 9,712,549 B2
(45) Date of Patent: Jul. 18, 2017

(54) SYSTEM, APPARATUS, AND METHOD FOR DETECTING HOME ANOMALIES

(71) Applicant: Abdullah Saeed Almurayh, Dammam (SA)

(72) Inventor: Abdullah Saeed Almurayh, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 133 days.

(21) Appl. No.: 14/592,707

(22) Filed: Jan. 8, 2015

(65) Prior Publication Data

US 2016/0205123 A1    Jul. 14, 2016

(51) Int. Cl.
*H04L 29/06*    (2006.01)

(52) U.S. Cl.
CPC ........ *H04L 63/1425* (2013.01); *H04L 63/145* (2013.01); *H04L 63/1416* (2013.01); *H04L 63/1466* (2013.01)

(58) Field of Classification Search
CPC . H04L 63/1425; H04L 63/1416; H04L 63/20; H04L 63/145; H04L 63/1466; H04L 63/14
See application file for complete search history.

(56) References Cited

U.S. PATENT DOCUMENTS

| 8,560,134 | B1 | 10/2013 | Lee |  |
|---|---|---|---|---|
| 8,973,133 | B1* | 3/2015 | Cooley | G06F 21/50 726/22 |
| 2003/0172302 | A1* | 9/2003 | Judge | H04L 63/145 726/22 |
| 2007/0016918 | A1* | 1/2007 | Alcorn | G06F 17/30743 725/22 |

(Continued)

FOREIGN PATENT DOCUMENTS

CN    10 3345211 A    10/2013

OTHER PUBLICATIONS

Md. Endadul Hogue et al., Trust Based Security Auto-Configuration for Smart Assisted Living Environments, Nov. 2009, ACM, pp. 7-12.*

(Continued)

*Primary Examiner* — Kari Schmidt
*Assistant Examiner* — Fahimeh Mohammadi
(74) *Attorney, Agent, or Firm* — Oblon, McClelland, Maier & Neustadt, L.L.P.

(57) ABSTRACT

An anomaly detection system includes appliances connected to a network and circuitry configured to receive statuses of the appliances. Patterns of use are determined for the appliances including time periods in which the appliances are most likely to be used. The circuitry is also configured to determine that anomalous events have occurred when an amount of deviation from a normal baseline status for the (Continued)

appliances is greater than a predetermined threshold. Cyber-attack events are detected based on changes to network configuration settings of the appliances. Alerts are output to an external device based on the one or more anomalous events and/or cyber-attack events related to the appliances. The patterns of use are updated based on the status of the appliances and a response from the external device related to the anomalous events or cyber-attack events.

19 Claims, 9 Drawing Sheets

(56) References Cited

U.S. PATENT DOCUMENTS

| | | | | |
|---|---|---|---|---|
| 2009/0193436 A1* | 7/2009 | Du | ............ | G06F 11/321 719/318 |
| 2011/0208849 A1* | 8/2011 | Barnett | ............ | H04L 63/1433 709/223 |
| 2011/0238234 A1* | 9/2011 | Chen | ............ | A62C 3/00 700/295 |
| 2012/0323381 A1* | 12/2012 | Yadav | ............ | H04L 63/0236 700/286 |
| 2013/0073094 A1* | 3/2013 | Knapton | ............ | F24F 11/0034 700/278 |
| 2014/0293046 A1* | 10/2014 | Ni | ............ | H04N 7/181 348/143 |
| 2014/0324192 A1* | 10/2014 | Baskaran | ............ | G05B 15/02 700/19 |
| 2015/0026806 A1* | 1/2015 | Lingafelt | ............ | H04L 63/1441 726/23 |
| 2015/0048679 A1* | 2/2015 | Kotowski | ............ | H04Q 9/00 307/31 |
| 2015/0048684 A1* | 2/2015 | Rooyakkers | ............ | H04L 9/3263 307/65 |
| 2015/0106933 A1* | 4/2015 | Lee | ............ | H04L 63/1425 726/23 |
| 2015/0309484 A1* | 10/2015 | Lyman | ............ | G05B 13/0205 700/275 |
| 2016/0148496 A1* | 5/2016 | Meredith | ............ | A61G 12/00 340/286.07 |

OTHER PUBLICATIONS

Pieter Simoens et al., Vision: Smart Home Control with Head-Mounted Sensors for Vision and Brain Activity, Jun. 2014, ACM, pp. 29-33.*

Weining Yang et al., Minimizing Private Data Disclosures in the Smart Grid, Oct. 16-18, 2012, ACM, pp. 415-427.*

Erman Ayday et al., Secure, Intuitive and Low-Cost Device Authentication for Smart Grid Networks, Jan. 9-12, 2011, IEEE, pp. 1161-1165.*

Vikramaditya Jakkula et al., "Detecting Anomalous Sensor Events in Smart Home Data for Enhancing the Living Experience," School of Electrical Engineering and Computer Science, Washington State University, Published 2011, Association for the Advancement of Artificial Intelligence (www.aaai.org), 5 pages.

* cited by examiner

Data Analysis Results - Dishwasher

| Time | 0000 | 0100 | 0200 | 0300 | 0400 | 0500 | 0600 | 0700 | 0800 | 0900 | 1000 | 1100 | 1200 | 1300 | 1400 | 1500 | 1600 | 1700 | 1800 | 1900 | 2000 | 2100 | 2200 | 2300 |
|---|---|---|---|---|---|---|---|---|---|---|---|---|---|---|---|---|---|---|---|---|---|---|---|---|
| Probability of Use | 0.1 | 0.05 | 0.05 | 0.05 | 0.3 | 0.65 | 0.8 | 0.8 | 0.75 | 0.5 | 0.5 | 0.05 | 0.05 | 0.05 | 0.05 | 0.1 | 0.1 | 0.25 | 0.3 | 0.5 | 0.7 | 0.65 | 0.5 | 0.4 |
| Normal Baseline | Not Running | | | | | Running | | | | | | Not Running | | | | | | | | | Running | | | |

Monday

SYSTEM, APPARATUS, AND METHOD FOR DETECTING HOME ANOMALIES

GRANT OF NON-EXCLUSIVE RIGHT

This application was prepared with financial support from the Saudi Arabian Cultural Mission, and in consideration therefore the present inventor has granted, the Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Keeping a home safe from intrusions, other physical attacks, and cyber-attacks is often a priority for homeowners. Homes are increasingly equipped with smart appliances and home controllers that connect to a network to allow a homeowner to remotely operate the smart appliances via a Smart Phone, tablet, or computer.

SUMMARY

According to an exemplary embodiment, an anomaly detection system includes appliances connected to a network and circuitry configured to receive statuses of the appliances. Patterns of use are determined for the appliances including time periods in which the appliances are most likely to be used. The circuitry is also configured to determine that anomalous events have occurred when an amount of deviation from a normal baseline status for the appliances is greater than a predetermined threshold. Cyber-attack events are detected based on changes to network configuration settings of the appliances. Alerts are output to an external device based on the one or more anomalous events and/or cyber-attack events related to the appliances. The patterns of use are updated based on the status of the appliances and a response from the external device related to the anomalous events or cyber-attack events.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4B is an exemplary illustration of data analysis results, according to certain embodiments;

DETAILED DESCRIPTION

Figure 1A:
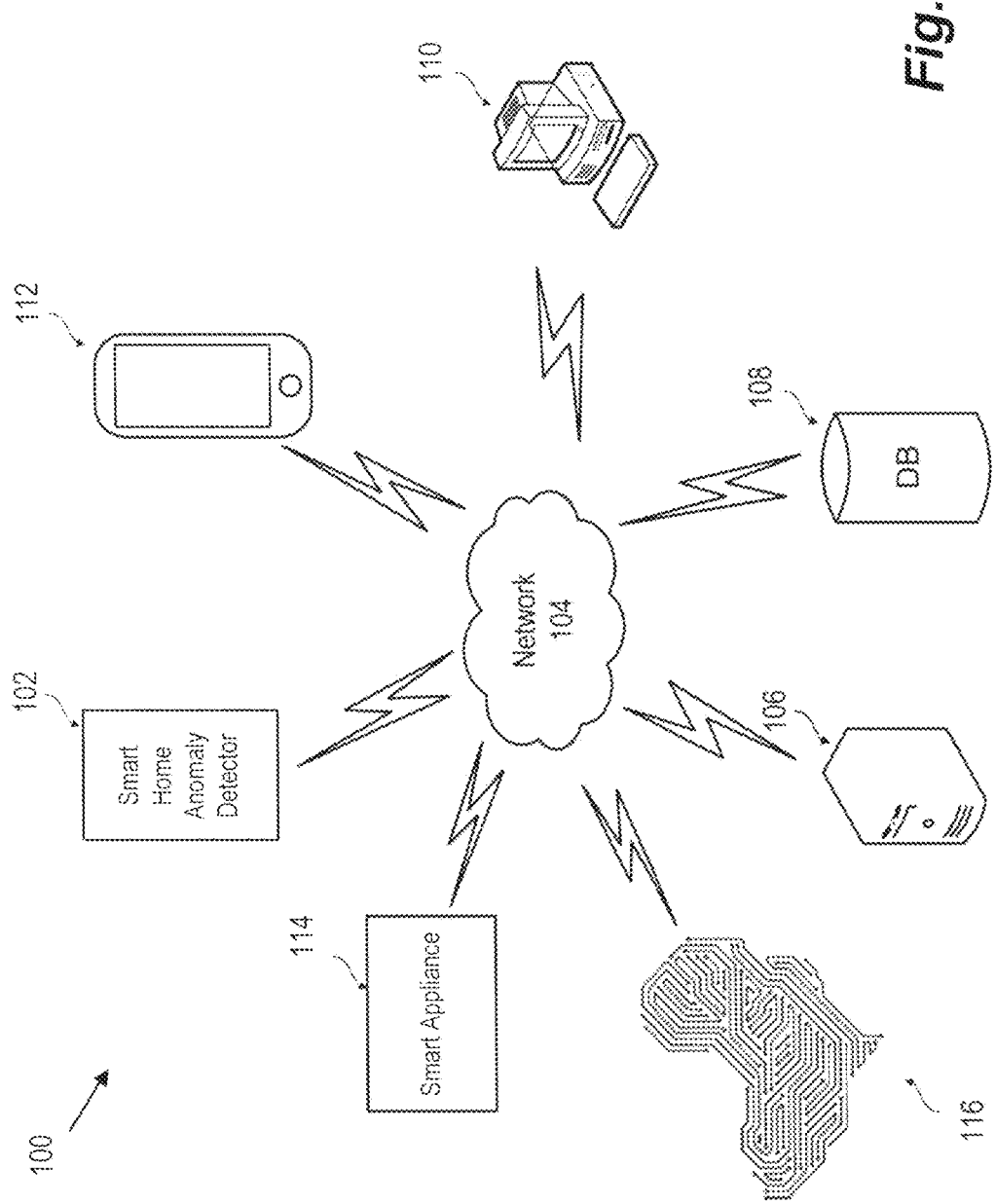
FIG. 1A is an exemplary illustration of a smart home anomaly detection system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a smart home anomaly detector that detects anomalous occurrences in a home by monitoring statuses of at least one smart appliance in the home. According to some implementations, a smart appliance is any type of electronic device that can be configured to connect to a wired or wireless network. Examples of smart appliances may include refrigerators, washing machines, dishwashers, media controllers, wireless routers, smoke detectors, home security systems, and the like that can be controlled by a user via an external device, such as a computer or mobile device.

The smart home anomaly detector can determine whether the current status of the smart appliances is normal or abnormal based on learned patterns of use. In certain embodiments, the smart home anomaly detector can notify a homeowner via a phone call, text message, email, or the like, that one or more appliances are in an abnormal status. The smart home anomaly detector can also notify emergency response personnel, such as a police and/or fire department that an emergency, such as a fire or burglary, may have occurred due to a change in status of the smart appliances in the home.

In addition, the smart home anomaly detector can detect occurrences of cyber-attacks related to the smart appliances, which may include instances of when network configuration settings for the smart appliances are compromised, and the smart appliances are used for malicious purposes, such as performing multiple data requests in order to overwhelm a computer system or network. In addition, the smart home anomaly detector may detect when the security settings of a smart appliance, which may include personal identification information, have been violated, which may be indicative of a cyber-attack.

FIG. 1A is an exemplary illustration of a smart home anomaly detection system 100, according to certain embodiments. A smart home anomaly detector (SHAD) 102 is connected to a server 106, database 108, computer 110, mobile device 112, smart appliance 114, and smart grid 116 via a network 104. The SHAD 102 can be an external device or can be embedded within a smart home controller or home appliance. The computer 110 acts as a client device that is connected to the server 106, the database 108, the mobile device 112, the smart appliance 114, the smart grid 116, and the SHAD 102 via the network 104. The server 106 represents one or more servers connected to the computer 110, the database 108, the mobile device 112, the smart appliance 114, the smart grid 116, and the SHAD 102 via the network 104. The database 108 represents one or more databases connected to the computer 110, the server 106, the mobile device 112, the smart appliance 114, the smart grid 116, and the SHAD 102 via the network 104.

The mobile device 112 represents one or more mobile devices connected to the computer 110, the server 106, the database 108, the smart appliance 114, the smart grid 116, and the SHAD 102 via the network 104. The network 104 represents one or more networks, such as the Internet, connecting the computer 110, the server 106, the database 108, the mobile device 112, the smart appliance 114, the smart grid 116, and the SHAD 102. In some embodiments, more than one SHAD 102 is included in the smart home anomaly detection system 100. As such, the terms referring to the one or more than one SHAD 102 can be used interchangeably.

The smart appliance 114 represents one or more smart appliances connected to the computer 110, the server 106, the database 108, the mobile device 112, the smart grid 116, and the SHAD 102 via the network 104. According to certain embodiments, the smart appliance 114 is configured to conduct two-way communications via the network 104. For example, the smart appliance 114, such as a washing machine, can receive a signal to commence a wash cycle from a user at an external device, such as the mobile device 112. The washing machine is also able to output a signal to the user at the mobile device 112 when the wash cycle has completed. In addition, the at least one smart appliance 114 can include home security devices, such as a smoke detectors and security systems that can be armed and/or disarmed remotely. The home security devices can also output a signal to alert the user, such as a homeowner, that an alarming condition exists.

The smart grid 116 represents one or more smart grids connected to the computer 110, the server 106, the database 108, the mobile device 112, the smart appliance 114, and the SHAD 102 via the network 104. According to certain embodiments, the smart grid 116 is an electrical grid that can predict and respond to the behaviors of electric power consumers. The smart grid 116 can control power distribution through a wide area network (WAN) that covers an area that may include one or more substations, capacitor banks, and voltage regulators. On a smaller level than the WAN, the neighborhood area network (NAN) controls power distribution to a community metering network, such as a in a residential neighborhood or one or more city blocks. The smart grid 116 can also monitor and control the power distribution to one or more electrical components in a home, such as the at least one smart appliance 114. Through communication with the at least one smart appliance 114 via the network 104, the smart grid 116 can determine patterns of how much power is consumed by the at least one smart appliance 114 and can tailor energy distribution to the home based on the power consumption patterns.

In certain embodiments, the SHAD 102 performs wireless or wired communications with at least one smart appliance 114. In some implementations, the at least one smart appliance 114 includes any appliance with circuitry that outputs a current status to the SHAD 102. For example, a refrigerator may be able to output a temperature and/or a status of a door being opened or closed. Examples of the at least one smart appliance 114 include home security systems, washing machines, kitchen appliances, HVAC systems, smoke detectors, and the like. The SHAD 102 and the at least one smart appliance 114 can communicate via wireless networks such as WI-FI, BLUETOOTH, cellular networks including EDGE, 3G and 4G wireless cellular systems, or any other wireless form of communication that is known. Other types of wireless networks used in smart homes with at least one smart appliance 114 can include ZIGBEE, Z-WAVE, HOMEPLUG, and the like.

As would be understood by one of ordinary skill in the art, based on the teachings herein, the mobile device 112 or any other external device could also be used in the same manner as the computer 110 to receive status updates regarding one or more anomalous conditions of the at least one smart appliance 114 from the SHAD 102. For example, when the SHAD 102 detects that the refrigerator door has been left open for a period of time that is greater than a predetermined threshold, the server 106 can output a text message or email to the mobile device 112 of the homeowner to alert the homeowner that an abnormal condition has occurred. In addition, the homeowner can access alerts from the SHAD 102 via an application on the mobile device 112. The SHAD 102 can also issue an alert to the mobile device 112 of the homeowner when one or more conditions exist that may indicate that the physical security and/or cyber security of the home has been violated. Details regarding the processes performed by the smart home anomaly detection system 100 are discussed further herein.

Figure 1B:
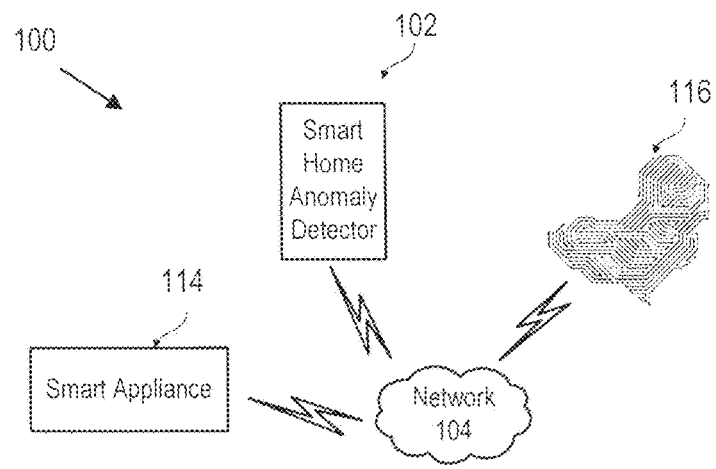
FIGS. 1B-1D are exemplary illustrations of configurations for a smart home anomaly detection system, according to certain embodiments.
Figure 1C:
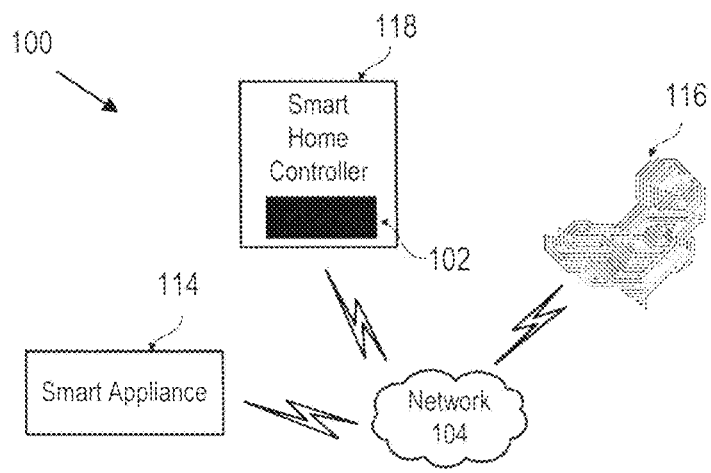
Figure 1D:
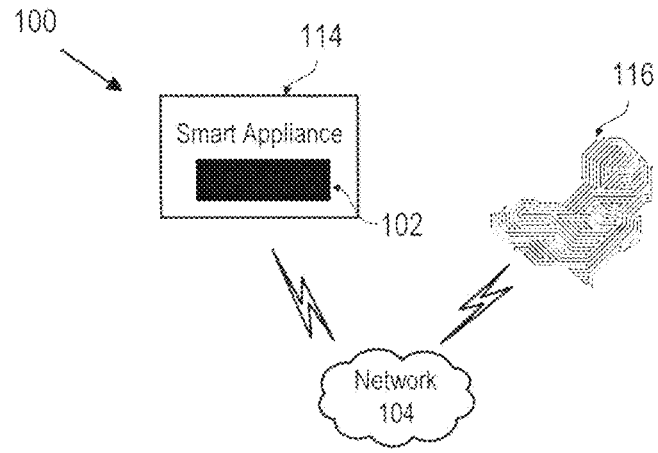

FIGS. 1B-1D are exemplary illustrations of configurations for the smart home anomaly detection system 100, according to certain embodiments. The computer 110, mobile device 112, server 106, and database 108 are not shown but can also be included in the embodiments illustrated by FIGS. 1B-1D. FIG. 1B illustrates a smart home anomaly detection system 100 where the SHAD 102 is a stand-alone external device that communicates with the at least one smart appliance 114 and the smart grid 116 via the network 104. In some implementations, the SHAD 102 includes a power source that is independent from other electrical loads in the home so that the SHAD 102 can detect losses of power to the at least one smart appliance 114. In addition, the SHAD 102 can have more than one power source to add power redundancy, which may include AC power, battery power, solar power, and the like.

FIG. 1C illustrates a smart home anomaly detection system 100 where the SHAD 102 is included in a smart home controller 118, such as the INSTEON home controller. In the embodiment illustrated by FIG. 1C, the SHAD 102 executes software processes for detecting home anomalies on the hardware of the smart home controller and also communicates with the at least one smart appliance and the smart grid 116 via the network 104. FIG. 1D illustrates a smart home anomaly detection system 100 where the SHAD 102 is included within the at least one smart appliance 114 as a built-in feature of the at least one smart appliance 114. For example, the at least one smart appliance 114 includes circuitry configured to execute the software processes of the SHAD 102 for detecting anomalous occurrences within the home.

Figure 2:
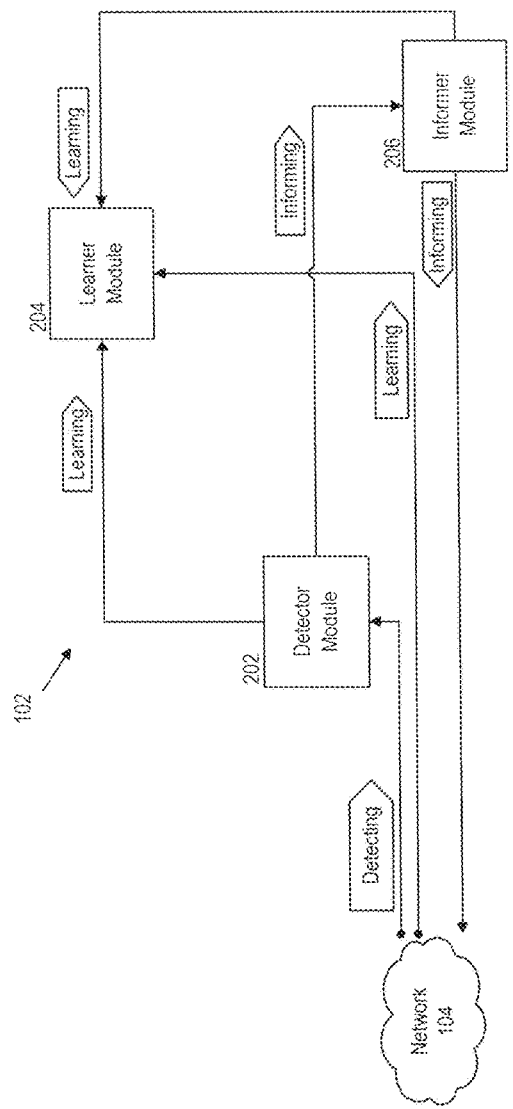
FIG. 2 is an exemplary illustration of software architecture for a smart home anomaly detector, according to certain embodiments.

FIG. 2 is an exemplary illustration of software architecture for a smart home anomaly detector 102, according to certain embodiments. Processing circuitry of the SHAD 102 continuously learns the status of the at least one smart appliance 114 in the home, detects a change in status of at least one smart appliance 114, determines whether the change in status of the at least one smart appliance 114 is normal and/or expected, issues alerts to the homeowner via the computer 110 or mobile device 112 if an activity related to one of the appliances is abnormal, and learns from the homeowner's response to the anomalous event. The processing circuitry of the SHAD 102 includes a detector module 202, a learner module 204, and an informer module 206.

The detector module 202 receives inputs from one or more sensors via network 104 to detect a change in status of the at least one smart appliance 114. For example, a refrigerator can have a temperature sensor and a door sensor to determine whether the door to the refrigerator has been opened or closed. If the temperature of the refrigerator increases above a predetermined range, such as 40° F.-45° F. and the door sensor indicates that the refrigerator has remained closed during the period of temperature increase, the detector module 202 may determine that an anomalous event has occurred, such as a loss of power to the refrigerator. The network 104 can include wired and wireless connections between the SHAD 102, the at least one smart appliance 114, and/or external devices, such as the computer 110 or mobile device 112. For example, the detector module 202 also receives data from the external devices which may include responses by the homeowner regarding anomalous events that have occurred.

In addition, the detector module 202 can also receive inputs from the smart grid 116 for the home that include power consumption, voltage, and current readings for the at least one smart appliance 114. For example, the processing circuitry of the detector module 202 can detect that a power failure has occurred with the at least one smart appliance 114 based on an immediate drop in voltage and/or current at the smart grid 116. In certain embodiments, the detector module 202 continuously monitors the one or more sensors to detect a change in the status of the smart appliances. In other implementations, the detector module 202 receives sensor values at a predetermined sampling rate based on the patterns of appliance status change determined by the learner module 204.

In some implementations, the processing circuitry of the detector module 202 is configured to detect instances of cyber-attack on the at least one smart appliance 114. For example, the detector module 202 can execute one or more software processes directed to detecting malicious use of the at least one smart appliance 114, such as a compromising of an IP address, network configuration settings, or security control settings, and other types of cyber hacking.

The detector module 202 compares the observed status for the appliance to a normal status of the appliance that has been determined by the learner module 204, as will be discussed further herein. Throughout the disclosure, the "normal" status of an appliance refers to an "expected" or "learned" status based on user preferences, learned patterns of appliance use, and the like. In addition, an "abnormal" or "anomalous" status of an appliance refers to an "unexpected" status that differs from one or more normal or learned statuses of the appliance. The normal or abnormal status of the at least one smart appliance 114 determined by the detector module is output to the learner module 204 and informer module 206. Details regarding processes performed by the detector module 202 are discussed further herein.

The learner module 204 employs machine learning techniques, such as artificial neural networks, support vector machines, the like, to determine patterns of use and patterns of status change of the at least one smart appliance 114 in the home. In certain embodiments, the learner module 204 determines a normal baseline status for the at least one smart appliance 114 based on time of day, day of the week, season, and the like. The normal baseline status based on patterns of use and historical data obtained by monitoring the statuses of the at least one smart appliance 114 and can include an average sensor value associated with the at least one smart appliance 114 based on time of day or an expected operational state. The learner module 204 also outputs the statuses of the at least one smart appliance 114 along with an associated normality or abnormality determination to appliance status logs that are saved in the database 108. According to certain embodiments, the appliance status logs are data structures that include cumulative appliance status data for a period of time. The processing circuitry of the SHAD 102 applies the machine learning techniques to the data in the appliance status logs to determine the normal baseline status for the at least one smart appliance 114. Details regarding processes performed by the learner module 204 are discussed further herein.

The informer module 206 receives alerts from the detector module 202 regarding one or more anomalous events with respect to the at least one smart appliance 114 and issues alerts to external devices of one or more interested parties, such as a homeowner, an emergency contact, or an emergency first responder. The alerts can be issued to the external devices, such as mobile devices 112, of the one or more interested parties via text message, voice call, email, or a notification via an application on the mobile device 112.

According to certain embodiments, the informer module 206 receives a response from the external device of an interested party, such as the homeowner, verifying whether the status of the smart appliance is actually anomalous. For example, based on the learned patterns of use of a washing machine, the processing circuitry of the detector module 202 may determine that the status of "running" for the washing machine at 12:00 PM on a Wednesday is anomalous, and the informer module 206 issues an alert to the mobile device 112 of the homeowner via the network 104 regarding the anomalous event of the running washing machine. If, in fact, the homeowner is using the washing machine at the time that the alert is issued, the homeowner can respond to the alert to indicate that the running washing machine is a normal event. The informer module 206 outputs the response from the interested party to the learner module 204 so that the historical data can be updated based on the response of the homeowner. Details regarding processes performed by the informer module 206 are discussed further herein.

Figure 3:
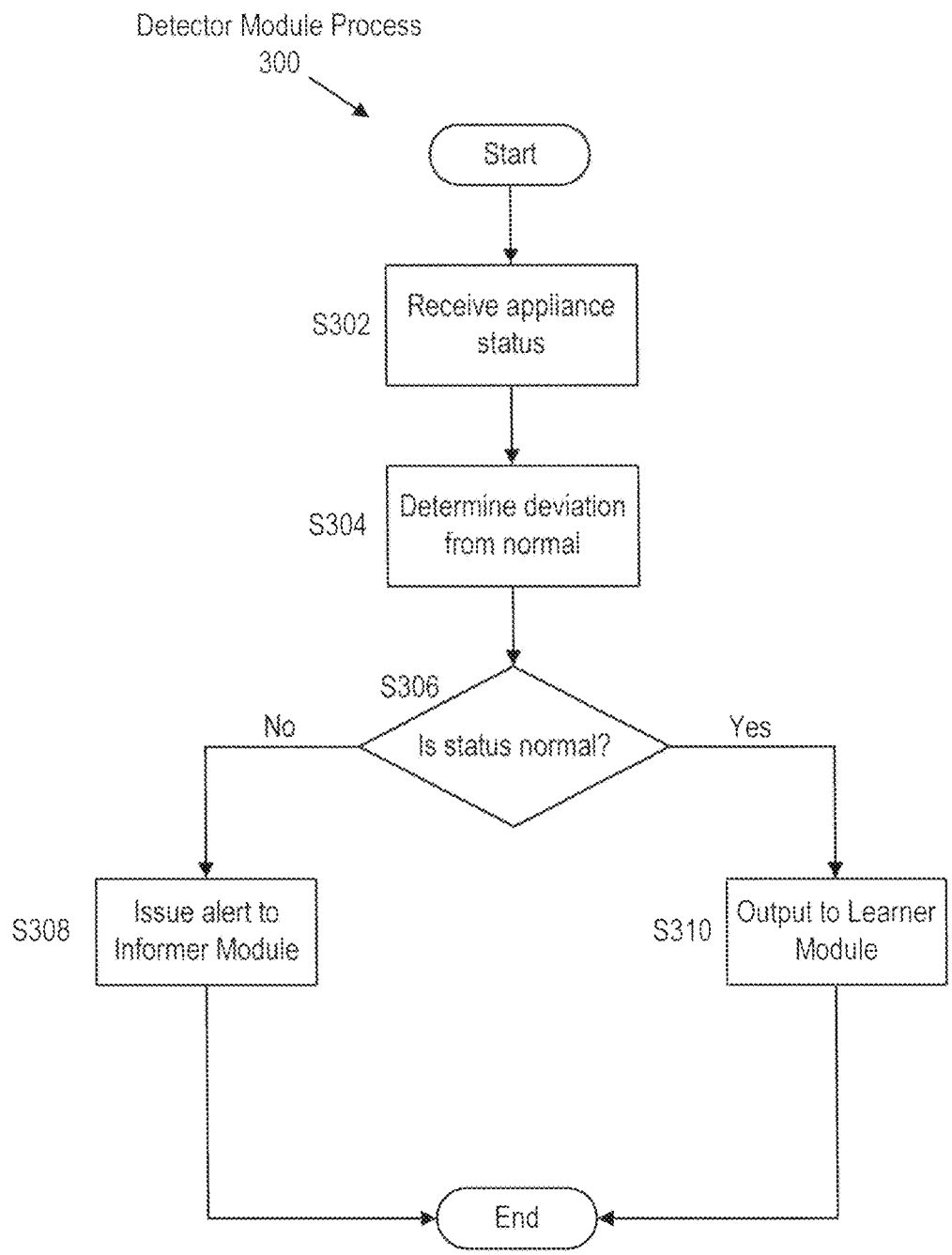
FIG. 3 is an exemplary flowchart of a detector module process, according to certain embodiments.

FIG. 3 is an exemplary flowchart of a detector module process 300, according to certain embodiments. At step S302, the detector module 202 of the SHAD 102 receives a status of the at least one smart appliance 114. In some implementations, the received status is based on one or more sensors, settings, and/or operational states associated with the smart appliance 114. For example, an ambient room temperature can be received by the detector module 202 to determine the status of the HVAC system. In certain embodiments, the detector module 202 continuously monitors the one or more sensors to detect a change in the status of the smart appliances. In other implementations, the detector module 202 receives sensor values at a predetermined sampling rate based on the patterns of use determined by the learner module 204. For example, the predetermined sampling rate at which the detector module 202 receives the status of the at least one smart appliance 114 may be higher than the sampling rate at time periods during the day or week when the at least one smart appliance 114 is less likely to be used. The detector module 202 can also receive appliance setting values from the at least one smart appliance 114, such as on, off, standby, sleep, and the like, at the predetermined sampling rate. In addition, the detector module 202 also receives inputs from the smart grid 116 for the home that include power consumption, voltage, and current readings for the at least one smart appliance 114 at the predetermined sampling rate.

In some implementations, the processing circuitry of the detector module 202 is configured to detect instances of cyber-attack on the at least one smart appliance 114, which are considered by be anomalous activities. For example, the detector module 202 can execute one or more software processes directed to detecting malicious use of the at least one smart appliance 114, such as a compromising of an IP address or network security settings and other types of cyber-hacking.

At step S304, the detector module 202 determines an amount of deviation from the normal baseline status for the at least one smart appliance 114. In certain embodiments, the amount of deviation from the normal baseline status is assigned a value of "very low," "low," "medium," or "high," which may be determined based on the historical data saved in the appliance status logs by the learner module 204. In some implementations, the amount of deviation from the normal baseline status is based on a probability of occurrence of the smart appliance 114 status based on the historical data saved in the appliance status logs. For a received status with a probability of occurrence of approximately one, the amount of deviation from the normal baseline status is assigned a value of very low. For a received status with a probability of occurrence of approximately zero, the amount of deviation from the normal baseline status is assigned a value of high. In addition, for instances of suspected cyber-attack on the at least one smart appliance 114, the amount of deviation from the normal baseline status is assigned a value of high.

For example, the learner module 204 may determine that the washing machine is normally run between 5:00 PM and 10:00 PM on Sundays. If the detector module 202 receives the appliance status of "running" from the washing machine at 6:00 PM on a Sunday, then the amount of deviation from the normal baseline status is determined to be "very low." Likewise, if the detector module 202 receives the operational state of "off," "standby," or "sleep" for the washing machine at 3:00 AM on a Friday, then the amount of deviation from the normal baseline status is also determined to be "very low." In addition, if the washing machine is running at 4:00 PM on a Sunday, the detector module 202 may assign an amount of deviation of "low" to the status of the washing machine. However, if the washing machine is running at 10:00 AM on a Tuesday, the detector module 202 may assign an amount of deviation of "high" to the status of the washing machine.

At step S306, it is determined whether the status of the smart appliance 114 is normal or anomalous. Throughout the disclosure, normal and anomalous statuses of the at least one smart appliance 114 are also referred to as normal and anomalous events. In certain embodiments, the detector module 202 determines that the status of the smart appliance 114 is normal if the amount of deviation from the normal baseline status is less than a predetermined threshold, such as when the amount of deviation from the normal baseline status is very low or low. In addition, the detector module 202 may determine that the status of the smart appliance 114 is anomalous if the amount of deviation from the normal baseline status is greater than a predetermined threshold, such as a medium or high amount of deviation. If it is determined that the status of the smart appliance 114 is normal, resulting in a "yes" at step S306, then step S310 is performed. Otherwise, if it is determined that the status of the smart appliance 114 is anomalous, resulting in a "no" at step S306, then step S308 is performed.

In some implementations, when an anomalous event is detected by the detector module 202 for the at least one smart appliance 114, the anomalous event is categorized by type. For example, types of anomalous events can include appliance failures, attacks, and dangers to homeowner. Appliance failures include anomalous events that indicate that the at least one smart appliance 114 has lost power due to a smart grid 116 failure or due to failure of the smart appliance 114. Failures can be detect by sensing a loss of voltage and/or current supplied to the at least one smart appliance 116.

Attacks can include physical attacks where the physical security of the home has been violated. This may be detected by an alarming security system, lights or fans that are turned on while the homeowner is away from home, and the like. Attacks can also include cyber-attacks where the integrity of communications for the at least one smart appliance 114 is violated, such as through a compromising of network security settings for the at least one smart appliance. Anomalous events that indicate dangers to the homeowner can include lack of use of the at least one smart appliance 114 for hours, days, and weeks, which may indicate that the homeowner may away from home or may be injured and unable to call for help. In some implementations, the SHAD 102 can receive input from an external device regarding instances when the homeowner is scheduled to be away from home. For example, the homeowner can send an email or text message to indicate to the SHAD 102 that he or she is away from home.

At step S308, if it is determined at step S306 that the status of the smart appliance 114 is anomalous, then an alert is issued to the informer module 206. For example, if the detector module 202 receives a status that the washing machine is running at 3:00 AM on a Wednesday, then the status may be assigned a high amount of deviation from the normal baseline status for the washing machine, resulting in an anomalous event. The detector module 202 can output the status of the washing machine, normality determination, and an associated time of occurrence to the informer module 206. The informer module 206 alerts the homeowner that the anomalous event has occurred regarding the at least one smart appliance 114 via email, text message, voice call, and the like, as will be discussed further herein.

At step S310, if it is determined at step S306 that the status of the smart appliance 114 is normal, then the result is output to the learner module 204. For example, if the detector module 202 receives a status that the washing machine is running at 5:30 PM on a Sunday, then the status may be assigned an amount of deviation from the normal baseline status of very low for the washing machine, resulting in a normal event. The detector module 202 can output the status of the washing machine, normality determination, and an associated time of occurrence to the learner module 204.

Figure 4A:
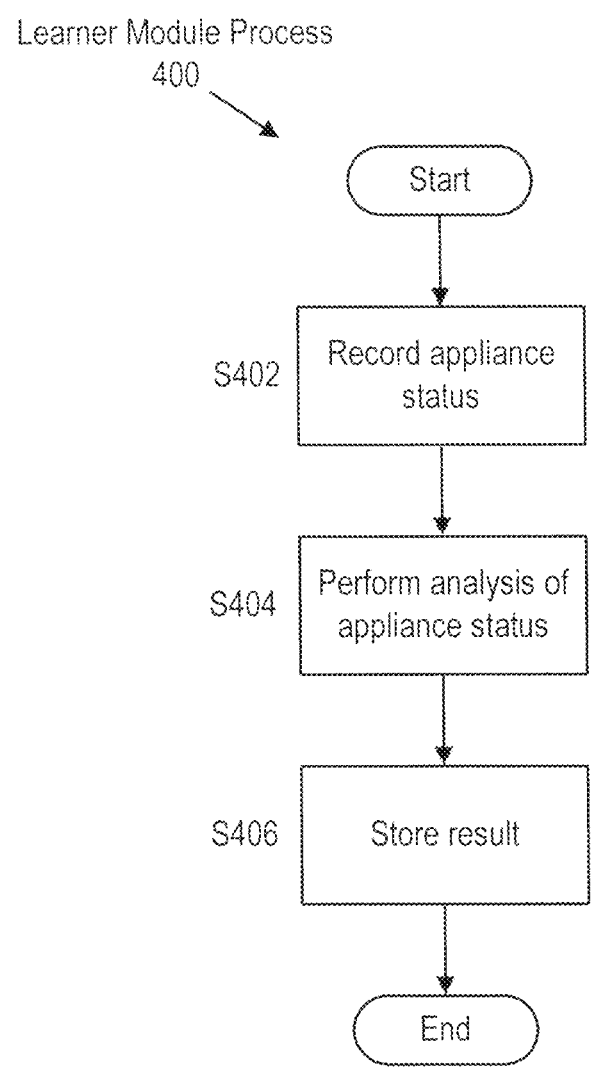
FIG. 4A is an exemplary flowchart of a learner module process, according to certain embodiments.

FIG. 4A is an exemplary flowchart of a learner module process 400, according to certain embodiments. At step S402, the learner module 204 of the SHAD 102 records appliance data for the at least one smart appliance 114. The appliance data is based on sensor values and statuses output from the at least one smart appliance 114. In some implementations, the learner module 204 receives the appliance status from the at least one smart appliance based on received status is based on one or more sensors associated with the smart appliance 114. For example, the learner module 204 can receive oven temperature sensor values and record the temperature values with an associated time in the appliance status log for the oven, which is saved in the database 108 along with an associated time at which the status of the at least one smart appliance 114 was received. In addition, the learner module 204 can record operational state from the smart appliance, such as on, off, standby, sleep, and the like. In addition, the learner module 204 can also receive inputs from the smart grid 116 for the home that include power consumption, voltage, and current readings for the at least one smart appliance 114 that are also recorded in the appliance status logs. In certain embodiments, the learner module 204 continuously records the sensor values from the at least one smart appliance 114.

In other implementations, the learner module 204 records sensor values in the appliance status logs at a predetermined sampling rate based on patterns of appliance use. For example, the learner module 204 may determine one or more time periods during the day or week when the at least one smart appliance 114 is most likely to be used. The predetermined sampling rate with which the learner module 204 records the status of the at least one smart appliance 114 in the appliance status log may be higher than the sampling rate at time periods during the day or week when the at least one smart appliance 114 is less likely to be used. For example, the sampling rate with which the learner module 204 records the status of the oven may be higher at times of the day when the oven is more likely to be used, such as between 12:00 PM and 10:00 PM, than during time periods when the oven is less likely to be used, such as between 12:00 AM and 6:00 AM.

In addition, the learner module 204 receives the normality determinations for the at least one smart appliance 114 from the detector module 202 during steps S308 and S310 of the detector module process 300. In some implementations, the learner module 204 records the normality determination along with the associated appliance status and time of occurrence in the appliance status log. For example, the processing circuitry of the detector module 202 may make a normality determination of normal for an oven that has status of "bake" and a temperature sensor at 400° F. at 6:00 PM. The learner module 204 records the normality determination in the appliance status log for the oven along with the time, status, and temperature sensor value.

According to certain embodiments, the learner module 204 also receives one or more homeowner responses to alerts regarding anomalous statuses for the at least one smart appliance 114. As will be discussed further herein, the processing circuitry of the SHAD 102 issues alerts to the homeowner via text message, email, voice call, and the like when the detector module 202 determines that an anomalous condition exists with the at least one smart appliance 114. The response by the homeowner to the alert from the informer module 206 is received by the learner module 204 and saved in the appliance status log for the at least one smart appliance 114.

At step S404, the processing circuitry of the learner module 204 analyzes the data in the appliance status logs to determine one or more patterns of use for the at least one smart appliance 114, according to certain embodiments. The processing circuitry employs machine learning techniques, such as artificial neural networks, support vector machines, the like, to determine patterns of use and patterns of status change of the at least one smart appliance 114 in the home. As the SHAD 102 acquires more data regarding how the at least one smart appliance 114 is used, the learner module 204 adapts the patterns of use based on changes in the home environment or in the homeowner's habits. In some implementations, the processing circuitry of the detector module 202 may determine that the current status of the at least one smart appliance 114 is anomalous based on the patterns of use determined by the learner module 204.

However, the homeowner may report that the current status of the at least one smart appliance is actually not anomalous when informed by the SHAD 102. The learner module 204 uses the information input by the homeowner to modify the patterns of use. In addition, in some implementations, the learner module 204 can analyze the security settings, network communication speed, network configuration, and the like of the at least one smart appliance 114 to determine a likelihood of cyber-attack. For example, an immediate reduction in the network communication speed may indicate that cyber-attackers are using the at least one smart appliance 114 to overwhelm the network 104. In addition, the patterns of use of the at least one smart appliance can be translated into the normal baseline status for the at least one smart appliance 114 that is used by the detector module 202 to determine whether the current status of the at least one smart appliance 114 is normal or anomalous.

At step S406, the processing circuitry of the learner module 204 stores the result of the data analysis in the database 108. According to certain embodiments, the results of the data analysis include the patterns of use of the at least one smart appliance 114 determined at step S404. FIG. 4B is an exemplary illustration of data analysis results 450 that are stored in the database 108, according to certain embodiments. The data analysis results 450 include entries for the at least one smart appliance 114 as well as likelihoods of use on a daily basis. For example, the data analysis results 450 illustrated by FIG. 4B show patterns of use for the dishwasher on Mondays. In some aspects, the data analysis results 450 include one or more times scales, such as weeks, months, seasons, or years, so that patterns of use can be determined based on the one or more time scales.

For each hour of the day, the processing circuitry of the learner module 204 determines a probability of use of the dishwasher based on historical data of dishwasher use saved in the appliance status log for the dishwasher. The probability of use can also be used to determine the normal baseline status for the at least one smart appliance 114. For the example of the dishwasher data analysis results 450 in FIG. 4B, the hours of the day with a probability of use of 0.0 to 0.5, indicating a low likelihood of use, are assigned a normal baseline status of "not running." The hours of the day with a probability of use of greater than 0.5 are assigned a normal baseline status of "running." In addition, the normal baseline status can also include a confidence factor that indicates a quality of the data.

In some implementations, the normal baseline status for smart appliances with statuses dependent on temperature sensors, such as HVAC systems, refrigerators, freezers, ovens, and the like, the normal baseline status can include an average temperature for each hour of the day. The amount of deviation from the normal baseline status determined at step S304 of the detector module process 300 may be based on the normal baseline status as well as the probability of use. For example, the processing circuitry may use the equation, $D=|x_i-m(X)|$ to determine the amount of deviation from the normal baseline status for the HVAC system based on temperature. D represents the deviation from the normal baseline status, $x_i$ represents a sample temperature value, and m(X) is the mean value of temperature sensor values over a predetermined period of time. In some implementations, the mean of the temperature sensor values is determined to be the normal baseline status for the HVAC system.

Figure 5:
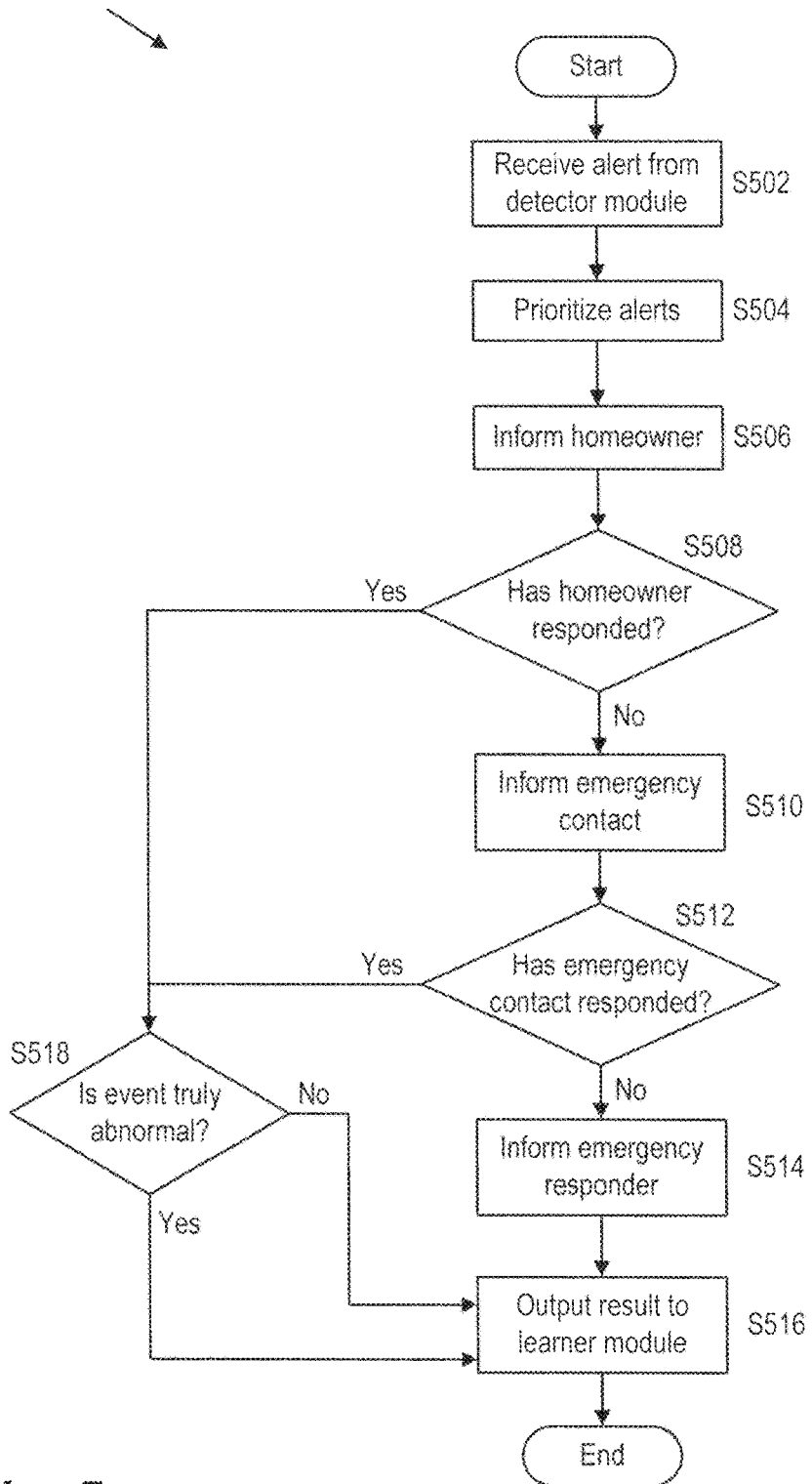
FIG. 5 is an exemplary flowchart of an informer module process, according to certain embodiments.

FIG. 5 is an exemplary flowchart of an informer module process 500, according to certain embodiments. At step S502, the informer module 206 receives an alert from the detector module 202 that an anomalous event has occurred with respect to the at least one smart appliance 114. The alert received by the informer module 206 can include the affected smart appliance 114, time that the anomalous event occurred, and the sensors values and/or settings of the smart appliance 114 affected by the anomalous event.

At step S504, the processing circuitry of the informer module 206 prioritizes the anomalous event alerts issued by the detector module at step S308 of the detector module process 300. According to certain embodiments, the prioritization is based on a predetermined severity level for the anomalous events based on ensuring safety of the home, user preferences, and learned patterns of use of the at least one smart appliance 114. For example, in some implementations, an alarming smoke detector or an alarming home security system is assigned a higher priority over the anomalous event of a refrigerator temperature that is outside the designated range of 40° F. to 45° F. In addition, anomalous events that are classified as attacks or dangers to the homeowner are assigned a higher priority than failures of the at least one appliance 114.

At step S506, an anomalous event alert is issued to a primary user, such as a homeowner, via a text message, email, voice call, or the like, which is received at an external device, such as the mobile device 112 or computer 110. In some implementations, the primary user is notified of the anomalous event via one or more alert screens of an application on an external device, such as the mobile device 112.

Figure 6:
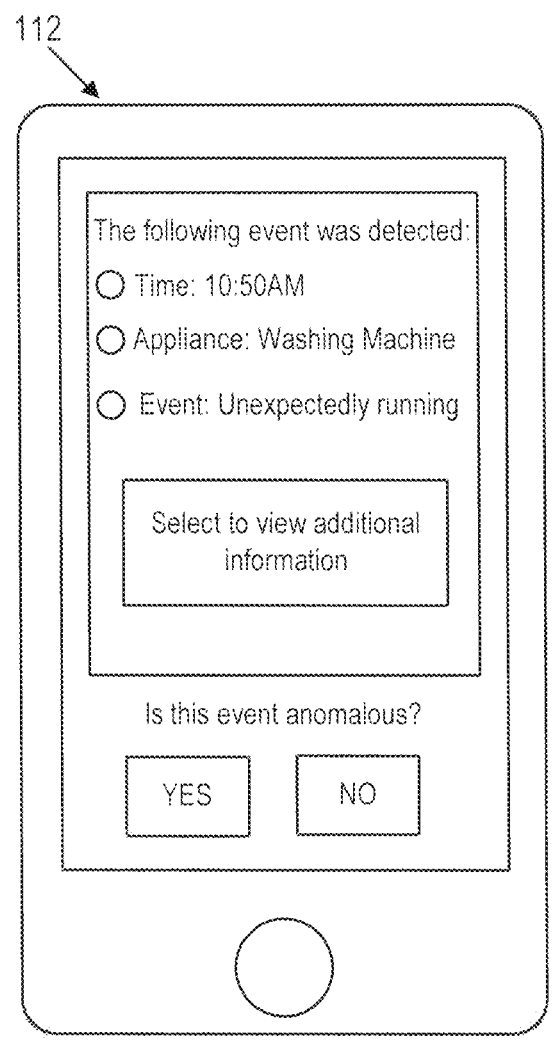
FIG. 6 is an exemplary illustration of an anomalous event notification, according to certain embodiments.

FIG. 6 is an exemplary illustration of an anomalous event notification, according to certain embodiments. In FIG. 6, the anomalous event is issued to the primary user, such as the homeowner, via an application on the mobile device 112. The screen on the mobile device 112 informs the homeowner of the time that the anomalous event occurred, the at least one smart appliance 114 affected by the anomalous event, and a summary of the anomalous event. For example, the homeowner can be notified at the mobile device 112 that the detector module 202 has determined that the washing machine is running at a time that is unlikely based on the patterns of use determined by the learner module 204. The homeowner can also make a selection at the interface for the application in order to view additional information regarding the anomalous event. According to certain embodiments, the homeowner can respond to the anomalous event alert by making a selection on the screen of the mobile device 112 regarding whether the event is truly anomalous or not. In other implementations, the homeowner can reply to the text, email, or voice call issued by the informer module 206.

Referring back to FIG. 5, at step S508, a determination is made regarding whether the homeowner has responded to the anomalous event alert within a predetermined period of time. According to some implementations, a user can specify the predetermined period of time for the primary user, such as the homeowner, to respond to the anomalous event via an interface at the SHAD 102, mobile device 112, or computer 110. For example, predetermined period of time for responding to the anomalous event can be set to 1 minute, 5 minutes, 10 minutes, and any other time period. If the homeowner has responded to the anomalous event alert within the predetermined period of time, resulting in a "yes" at step S508, then step S518 is performed. Otherwise, if the homeowner has not responded to the anomalous event alert within the predetermined period of time, resulting in a "no" at step S508, then step S510 is performed.

At step S510, if it is determined at step S508 that the primary user has not responded to the anomalous event alert within the predetermined period of time, then the informer module 206 issues the anomalous event alert to a secondary user, such as an emergency contact indicated by the primary user at an interface at an interface at the SHAD 102 or other external device, such as the computer 110 or mobile device 112. According to certain embodiments, the anomalous event alert is issued to the emergency contact via text message, email, voice call, or the like, which is received at an external device, such as the mobile device 112 or computer 110. In some implementations, the emergency contact is notified of the anomalous event via one or more alert screens of an application on an external device, such as the mobile device 112 as described previously with respect to FIG. 6.

At step S512, a determination is made regarding whether the emergency contact has responded to the anomalous event alert within a predetermined period of time. According to some implementations, a user can specify the predetermined period of time for the secondary user, such as the emergency contact, to respond to the anomalous event via an interface at the SHAD 102, mobile device 112, or computer 110. For example, predetermined period of time for responding to the anomalous event can be set to 1 minute, 5 minutes, 10 minutes, and any other time period. If the emergency contact has responded to the anomalous event alert within the predetermined period of time, resulting in a "yes" at step S512, then step S518 is performed. Otherwise, if the homeowner has not responded to the anomalous event alert within the predetermined period of time, resulting in a "no" at step S512, then step S514 is performed.

At step S514, if it is determined at step S512 that the secondary user has not responded to the anomalous event alert within the predetermined period of time, then the informer module 206 issues the anomalous event alert to an emergency responder via emergency response system, such as a dispatch center for emergency responders that may include medical first responders, law enforcement, and the like. According to certain embodiments, the anomalous event alert is issued to the emergency response system via text message, email, voice call, or the like, which is received at an external device, such as the mobile device 112 or computer 110. In some implementations, the emergency response system is notified of the anomalous event via one or more alert screens of an application on an external device, such as the mobile device 112 as described previously with respect to FIG. 6.

According to some embodiments, the emergency responder notification of step S514 is performed if the anomalous event is related to a potential safety or security issue for the home. For example, anomalous events related to the home security system or smoke detector are reported to the emergency responder at step S514, but anomalous events such as an unexpectedly running washing machine or dishwasher may not be reported to the emergency responder.

At step S518, if it is determined at step S508 or step S512 that the homeowner or the emergency contact has responded to the anomalous event alert, resulting in a "yes" at step S508 or step S512, then it is determined whether the anomalous event was truly abnormal based on the response of the homeowner or emergency contact. In the example of FIG. 6, the processing circuitry of the informer module 206 determines whether the homeowner or emergency contact selected "yes" or "no" regarding whether the event is truly anomalous or not. If the homeowner or emergency contact confirms that the event is truly anomalous, then a "yes" is output to step S516. Otherwise, if the homeowner or emergency contact responds that the event is normal, as in not anomalous, then a "no" is output to step S516.

At step S516, the user response by the homeowner, emergency contact, or emergency responder to the anomalous event is output to the learner module 204. The user response to the anomalous event can be associated with appliance data recorded in the appliance status logs at step S402 in order to update the patterns of use for the at least one smart appliance 114.

The smart home anomaly detection system 100 allows homeowners to know and maintain a level of safety of their homes by monitoring changes in the statuses of the at least one smart appliance 114 that communicates with the SHAD 102 so that the at least one smart appliance 114 contributes to the overall integrity and security of the home. In addition, as the number of devices and appliances within a home that can communicate with the network 104 increases, the devices and appliances become increasingly vulnerable to cyber-attack. The SHAD 102 is able to detect compromises in network configurations and security settings of the at least one smart appliance 104 to minimize the effects of potential cyber-attacks.

A hardware description of the smart home anomaly detector 102 according to exemplary embodiments is described with reference to FIG. 7. In addition, the hardware described by FIG. 7 can also apply to the computer 110, the server 106, and the mobile device 112. Implementation of the processes of the smart home anomaly detection system 100 on the hardware described herein improves the speed and accuracy of the detection of anomalous events within a home. The SHAD 102 includes a CPU 700 with the processing circuitry that performs the processes described herein. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the SHAD 102 communicates, such as the computer 110.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

Figure 7:
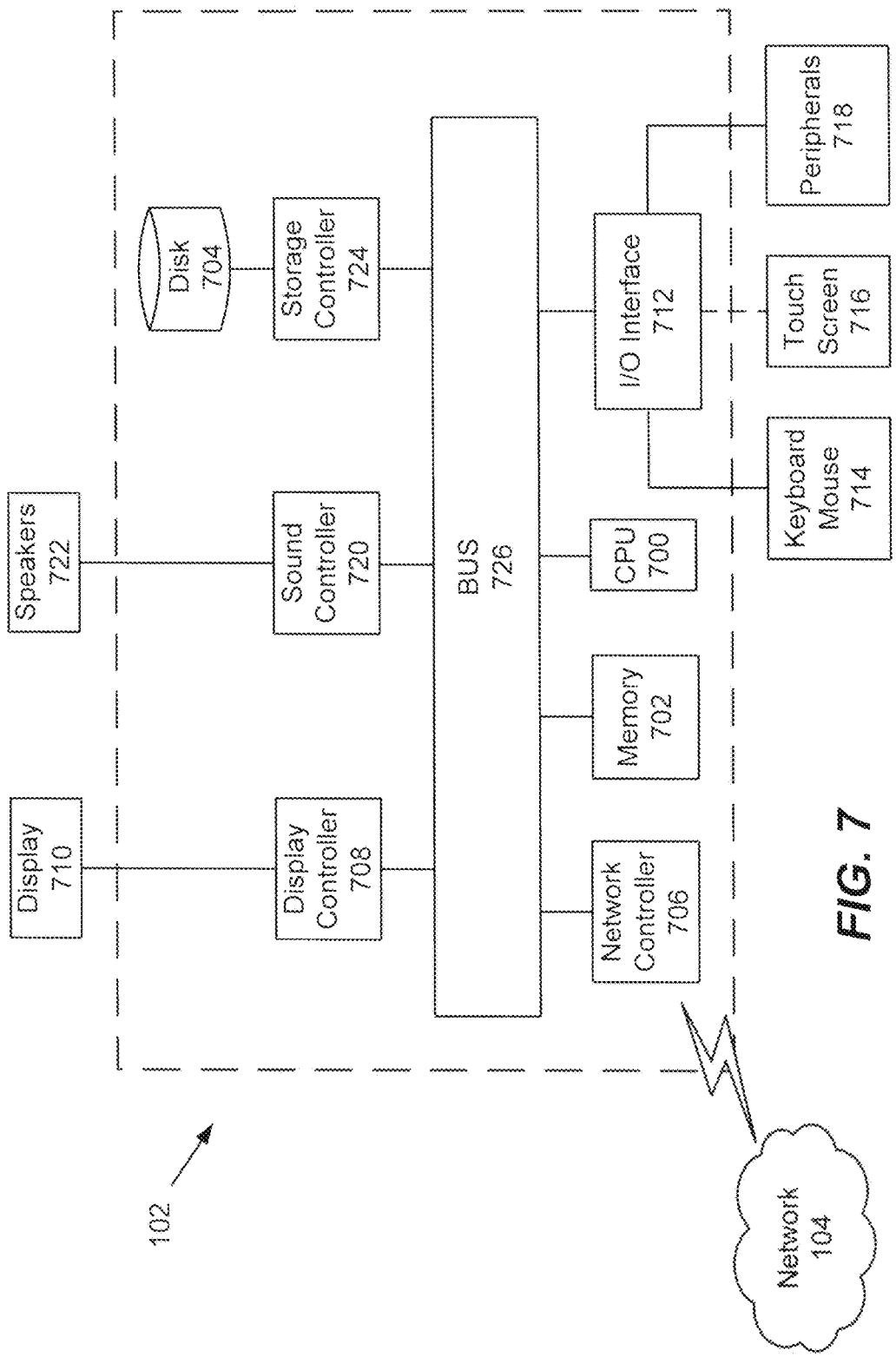
FIG. 7 illustrates a non-limiting example of a smart home anomaly detector, according to certain embodiments.

The SHAD 102 in FIG. 7 also includes a network controller 706, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The SHAD 102 further includes a display controller 708, such as a NVIDIA GeForce GTX or Quadro graphics adaptor from NVIDIA Corporation of America for interfacing with display 710 of the SHAD 102 and the computer 110, such as a Hewlett Packard HPL2445w LCD monitor. A general purpose I/O interface 712 at the SHAD 102 interfaces with a keyboard and/or mouse 714 as well as a touch screen panel 716 on or separate from display 710. General purpose I/O interface 712 also connects to a variety of peripherals 718 including printers and scanners, such as an OfficeJet or DeskJet from Hewlett Packard.

A sound controller 720 is also provided in the SHAD 102, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the SHAD 102. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

In other alternate embodiments, processing features according to the present disclosure may be implemented and commercialized as hardware, a software solution, or a combination thereof. Moreover, instructions corresponding to the detector module process 300, learner module process 400, and informer module process 500 in accordance with the present disclosure could be stored in a thumb drive that hosts a secure process.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. An anomaly detection system comprising:
at least one appliance configured to connect to at least one network; and
circuitry configured to receive, from the at least one appliance, a status based on at least one of a setting, an operational sate, or sensor values associated with the at least one appliance, monitor the received status of the at least one appliance over one or more periods of time including at least one of a time of day, day of a week, or season to generate historical data for the status of the at least one appliance, determine patterns of use for the at least one appliance by applying learning techniques to the generated historical data of the at least one appliance, determine a normal baseline status based on the patterns of use of the at least one appliance, determine, based on the patterns of use, one or more anomalous events have occurred when an amount of deviation in the status of the at least one appliance from the normal baseline status for the at least one appliance is greater than a predetermined threshold, detect that the one or more anomalous events are cyber-attack events based on changes to network configuration settings of the at least one appliance, classify the one or more anomalous events as at least one of an appliance failure, an attack, and danger to a homeowner based on the status of the at least one appliance and the patterns of use, wherein the circuitry classifies an anomalous event as a danger to homeowner based on an absence of appliance use without a received indication that the homeowner is away from home, update the patterns of use for the at least one appliance based on at least one of the status of the at least one appliance and a response from the at least one external device related to the one or more anomalous events, determine, based on the patterns of use of the at least one appliance, a predetermined sampling rate for receiving the status of the at least one appliance wherein the predetermined sampling rate increases as a probability of use of the at least one appliance increases, and output alerts, to at least one external device, based the determining of an occurrence of an anomalous event and based on the classification of the anomalous event.

2. The system of claim 1, wherein the at least one appliance is operated remotely via the at least one external device.

3. The system of claim 1, wherein the circuitry is further configured to output the alerts to the at least one external device via at least one of a text message, email, voice call, or application notification.

4. The system of claim 3, wherein the circuitry is further configured to prioritize the alerts based on a predetermined severity level of the one or more anomalous events.

5. The system of claim 4, wherein the circuitry is further configured to output the alerts to a secondary external device when a first predetermined time period of non-response from the at least one external device has passed.

6. The system of claim 5, wherein the circuitry is further configured to output the alerts to an emergency response system when a second predetermined time period of non-response from the secondary external device has passed.

7. The system of claim 5, wherein the circuitry is further configured to confirm an abnormality of the one or more anomalous events based on the response received from the at least one external device.

8. The system of claim 1, wherein the circuitry is further configured to monitor and control distribution to the at least one appliance via a smart grid.

9. The system of claim 8, wherein the circuitry is further configured to determine the one or more anomalous events based on detected changes in at least one of voltage and current for the at least one appliance based on input from a smart grid serving the at least one appliance.

10. The system of claim 9, wherein the circuitry is further configured to detect power failures at the at least one appliance based on a loss of the voltage or the current supplied to the at least one appliance by the smart grid.

11. The system of claim 1, wherein the circuitry is further configured to detect the cyber-attack events based on at least one of a reduction in communication speed for the at least one network, a compromising of an IP address of the at least one appliance, and an execution of malicious software.

12. The system of claim 1, wherein the circuitry is further configured to determine the probability of use of the at least one appliance based on a time of day.

13. The system of claim 12, wherein the circuitry is further configured to determine the probability of use of the at least one appliance based on at least one of a week, month, season, or year.

14. The system of claim 1, wherein the circuitry is further configured to determine one or more normal events have occurred when the amount of deviation from the normal baseline status is less than the predetermined threshold.

15. The system of claim 1, wherein the circuitry is further configured to classify the one or more anomalous events as at least one of failures, attacks, or dangers to a homeowner based on the status of the at least one appliance and the patterns of use.

16. The system of claim 15, wherein the circuitry is further configured to prioritize the attacks and the dangers to the homeowner higher than the failures.

17. The system of claim 1, wherein the circuitry receives power from more than one redundant power source.

18. An apparatus for detecting anomalous events, comprising:

circuitry configured to receive, from at least one appliance, a status based on at least one of a setting, an operational sate, or sensor values associated with the at least one appliance, monitor the received status of the at least one appliance over one or more periods of time including at least one of a time of day, day of a week, or season to generate historical data for the status of the at least one appliance, determine patterns of use for the at least one appliance by applying learning techniques to the generated historical data of the at least one appliance, determine a normal baseline status based on the patterns of use of the at least one appliance, determine, based on the patterns of use, one or more anomalous events have occurred when an amount of deviation in the status of the at least one appliance from the normal baseline status for the at least one appliance is greater than a predetermined threshold, detect that the one or more anomalous events are cyber-attack events based on changes to network configuration settings of the at least one appliance, classify the one or more anomalous events as at least one of an appliance failure, an attack, and danger to a homeowner based on the status of the at least one appliance and the patterns of use, wherein the circuitry classifies an anomalous event as a danger to homeowner based on an absence of appliance use without a received indication that the homeowner is away from home, update the patterns of use for the at least one appliance based on at least one of the status of the at least one appliance and a response from the at least one external device related to the one or more anomalous events or the cyber-attack events, determine, based on the patterns of use of the at least one appliance, a predetermined sampling rate for receiving the status of the at least one appliance wherein the predetermined sampling rate increases as a probability of use of the at least one appliance increases, and output alerts, to at least one external device, based the determining of an occurrence of an anomalous event and based on the classification of the anomalous event.

19. A method for detecting anomalous events, comprising:

receiving, from at least one appliance, a status based on at least one of a setting, an operational sate, or sensor values associated with the at least one appliance;

monitoring the received status of the at least one appliance over one or more periods of time including at least one of a time of day, day of a week, or season to generate historical data for the status of the at least one appliance;

determining, via processing circuitry, patterns of use for the at least one appliance by applying learning techniques to the generated historical data of the at least one appliance;

determining, via the processing circuitry, a normal baseline status based on the patterns of use of the at least one appliance;

determining, via the processing circuitry, based on the patterns of use, one or more anomalous events have occurred when an amount of deviation in the status of the at least one appliance from the normal baseline status for the at least one appliance is greater than a predetermined threshold;

detecting, via the processing circuitry, that the one or more anomalous events are cyber-attack events based on changes to network configuration settings of the at least one appliance;

classifying, via the processing circuitry, the one or more anomalous events as at least one of an appliance failure, an attack, and danger to a homeowner based on the status of the at least one appliance and the patterns of use, wherein the processing circuitry classifies an anomalous event as a danger to homeowner based on an absence of appliance use without a received indication that the homeowner is away from home, updating, via the processing circuitry, the patterns of use for the at least one appliance based on at least one of the status of the at least one appliance and a response from the at least one external device related to the one or more anomalous events or the cyber-attack events;

determining, via the processing circuitry, a predetermined sampling rate for receiving the status of the at least one appliance wherein the predetermined sampling rate increases as a probability of use of the at least one appliance increases based on the patterns of use of the at least one appliance; and outputting alerts, to at least one external device, based the determining of an occurrence of an anomalous event and based on the classification of the anomalous event.

* * * * *